United States Patent [19]

Inoue et al.

[11] 4,303,857
[45] Dec. 1, 1981

[54] AUTOMATIC THERMOLUMINESCENCE DOSIMETRIC SYSTEM

[75] Inventors: Isamu Inoue, Neyagawa; Seiko Minamide, Nara; Makoto Okuda, Hirakata, all of Japan

[73] Assignee: Matsushita Electric Industrial Co., Ltd.,, Osaka, Japan

[21] Appl. No.: 49,907

[22] Filed: Jun. 19, 1979

[30] Foreign Application Priority Data

Jun. 29, 1978 [JP] Japan .................................. 53/79312
Jun. 29, 1978 [JP] Japan .................................. 53/79313
Jun. 29, 1978 [JP] Japan .................................. 53/79314

[51] Int. Cl.³ .......................... G01T 1/00; G01T 1/11
[52] U.S. Cl. ..................................... 250/328; 250/337
[58] Field of Search ............... 250/328, 337, 472, 483, 250/484

[56] References Cited

U.S. PATENT DOCUMENTS 2,902,605  9/1959  Wallack ............................... 250/337
3,404,272 10/1968  Bryer .................................. 250/484
3,809,901  5/1974  Szalanczy ........................... 250/337

Primary Examiner—Alfred E. Smith
Assistant Examiner—Janice A. Howell
Attorney, Agent, or Firm—Spencer & Kaye

[57] ABSTRACT

An automatic thermo-luminescence desimeter, comprising a thermo-luminescence dosimeter element which is composed of a card carrying a thermo-luminescence material and contained in an encasing member; a magazine adapted to accommodate therein a plurality of the thermo-luminescence dosimeter elements; means for transporting the magazine; card feeding means for extracting a thermo-luminescence dosimeter element from the magazine and feeding the element into a longitudinal groove formed in a housing; releasing means for releasing engagement between the card and the encasing member; means for feeding the card into a transversal groove formed in the housing; heating means for heating the thermo-luminescence material carried by the card fed to the transversal groove by irradiating with infrared rays; and photoelectric converter means for converting thermo-luminescence emitted by the thermo-luminescence material into an electric signal, whereby doses of exposed radiation of the individual theremo-luminescence dosimeter elements are successively measured within a short time.

11 Claims, 20 Drawing Figures

FIG. 17
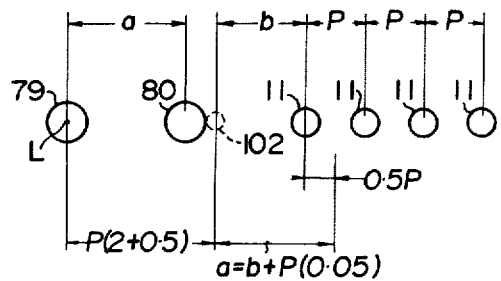
FIG. 18
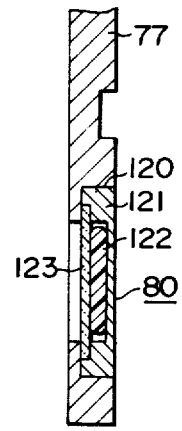
FIG. 20
FIG. 19
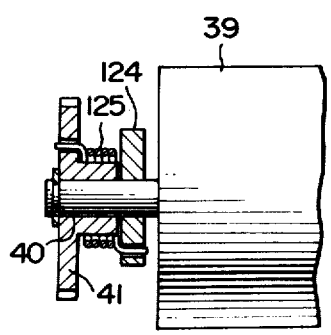
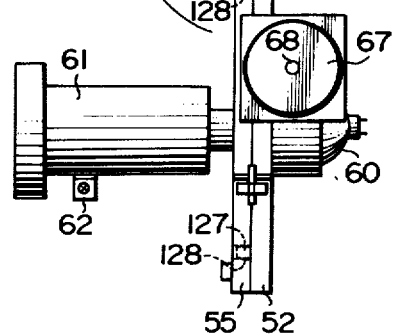

AUTOMATIC THERMOLUMINESCENCE DOSIMETRIC SYSTEM

The present invention relates to an automatic thermo-luminescence dosimetric system for measuring an exposure dose of radiation.

It is known that when a thermo-luminescent material exposed to radioactive rays is heated, thermo-luminescence is produced in proportion to the exposure dose of radiation. It is thus possible to determine the exposure dose by converting the thermo-luminescence into a current with the aid of a photoelectric multiplier tube and integrating the output current or alternatively by counting the number of photons produced by the thermo-luminescence.

The objects, novel features and advantages of the invention will be made apparent by examining the following description of the preferred embodiments of the invention taken in conjunction with the drawings, in which:

FIG. 17 is a view to illustrate the positional relationships among various parts of the dosimeter in the state shown in FIG. 14;

FIG. 18 is a sectional view of a plate for driving a card in the thermo-luminescence dosimeter;

FIG. 19 is a sectional view showing the main portion of an element transporting mechanism in the thermoluminescence dosimeter according to another embodiment of the invention; and FIG. 20 is a top plan view of a heating and measuring portion of the thermo-luminescence dosimeter according to still another embodiment of the invention.

Figure 1:
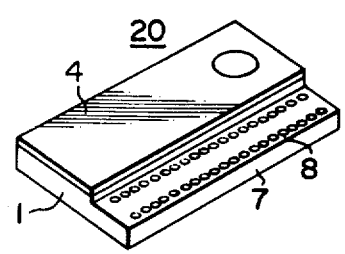
FIG. 1 is a perspective view showing a thermoluminescence radiation dosimeter element (hereinafter referred to simply as an element) used for a thermoluminescence dosimeter according to the invention.
Figure 2:
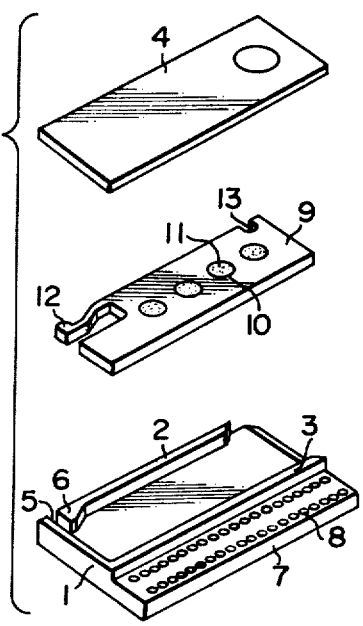
FIG. 2 is an exploded perspective view of the radiation dosimeter element shown in FIG. 1.

Referring to FIGS. 1 and 2 which show a radiation dosimeter element, reference numeral 1 denotes the main-body of a case having a straight protrusion 2 and a substantially L-shaped protrusion 3 on which a cover plate 4 is fixedly mounted to constitute a case having an open end.

A notch 5 is provided between the protrusions 2 and 3 adjacent to a lateral projection 6 formed at one end of the protrusion 2. Reference numeral 7 designates an information or data read-out field which is formed integrally with the main body 1 at a side thereof and has a number of blind holes 8. By piercing given blind holes, cards identifying personnel or the like are recorded.

A card 9 to be contained in the case has a plurality of holes 10 each of which is provided with a film having particles 11 of thermo-luminescence material bonded thereto. Numeral 12 designates a latch or claw, and 13 designates a recess formed in the card 9. When the card 9 is inserted into the case, the latch 12 will engage with the notch 5 to retain and hold the card within the case.

Figure 3:
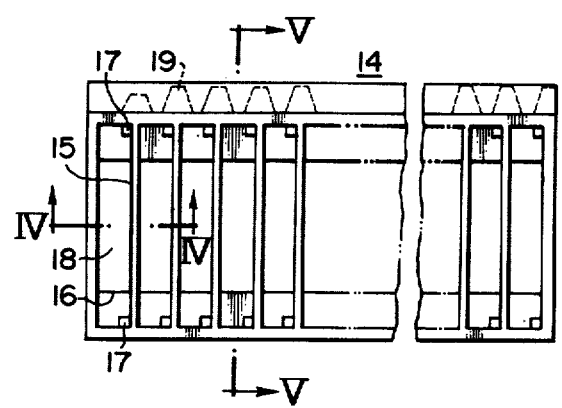
FIG. 3 is a top plan view of a magazine for accommodating therein thermo-luminescence dosimeter elements.
Figure 4:
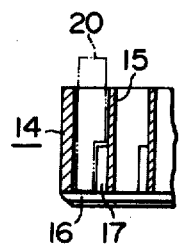
FIG. 4 is a fragmental sectional view of the magazine taken along the line IV—IV in FIG. 3.
Figure 5:
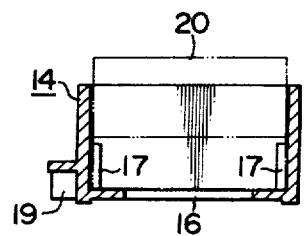
FIG. 5 is a cross-sectional view of the magazine taken along the line V—V in FIG. 3.

Referring to FIGS. 3 to 5, numeral 14 denotes a magazine which has a top wall adapted to be opened and a plurality of partition walls 15 defining a corresponding number of compartments 18 within the magazine. Apertures 16 are formed in the bottom of the magazine 14. Projections 17 are provided at corners of each of the compartments 18. Rack teeth 19 are formed at a side of the magazine.

The element denoted generally by numeral 20 in FIG. 1 is inserted into each of the compartments 18 of the magazine 14 with the data read-out board or field 7 located on the bottom thereof, as is indicated by broken lines in FIGS. 4 and 5.

Figure 6:
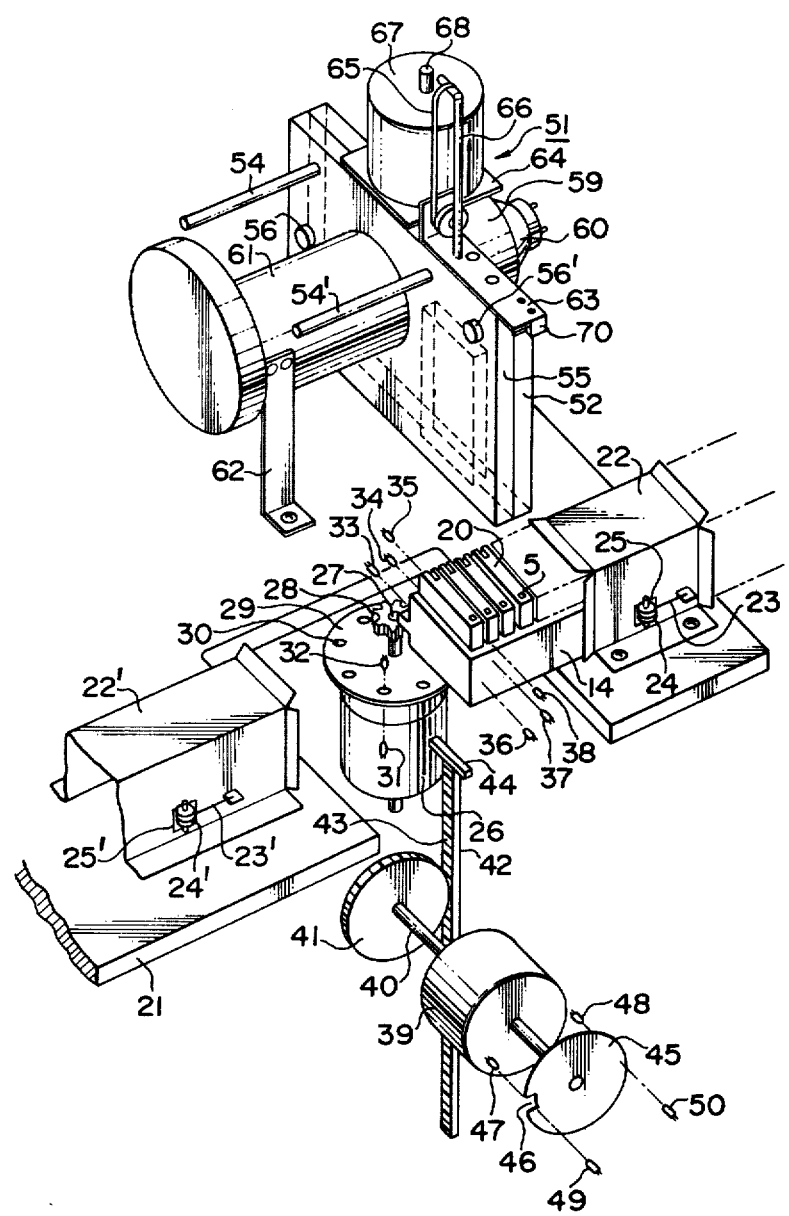
FIG. 6 shows schematically in a perspective view the structure of the thermo-luminescence dosimeter according to an embodiment of the invention.

Referring to FIG. 6, numeral 21 designates a base plate on which channel-like guides 22 and 22' are fixedly mounted. Leaf springs 23 and 23' are secured at one ends thereof to the guide members 22 and 22', respectively. The other end portions of the springs 23 and 23' are pressed against respective roller 24 and 24' which project partially into the interior of the guide members 22 and 22' through respective windows 25 and 25' thereby to press the magazine 14 toward the opposite side walls of the guides 22 and 22' under the resilient force of the springs 23 and 23'.

Numeral 26 denotes a pulse motor having a rotatable shaft 27 on which a pinion gear 28 is fixedly mounted and adapted to mesh with the teeth of the rack 19 provided at the magazine 14. A disc 29 is mounted fixedly on the rotatable shaft 27 and has a plurality of through-holes 30 formed in the peripheral portion with equi-distance therebetween. A light emission diode 31 and a phototransistor 32 are disposed in opposition to each other with the disc 29 interposed therebetween. The number of through-holes 30 corresponds to the number of teeth of the pinion gear 28. In the case of the illustrated embodiment, this number is assumed to be equal to eight. So far as the pulse motor 26 is rotated correctly in conformance to the commanded number of pulses, a corresponding number of the holes 30 is detected by the phototransistor 32 in cooperation with the light emission diode 31, whereby the transportation or movement of the magazine 14 for a predetermined distance can be detected.

Light emission diodes 33, 34 and 35 are disposed in the vicinity of one side of the magazine in alignment with phototransistors 36, 37 and 38, respectively, which are provided adjacent to the other or opposite side of the magazine 14. The combination of the light emitting diode 33 and the phototransistor 36 serves to detect the meshing engagement between the gear 28 and the rack 19 of the magazine 14 after the magazine 14 has been inserted into the guide 22, while the photoelectric array of the light emission diode 34 and the phototransistor 37 serves to detect the trailing end of the magazine 14. The light emission diode 35 and the phototransistor 38 cooperate to detect whether the element 20 is contained in the magazine 14. When it is detected by the light emission diode 35 and the phototransistor 38 that no element 20 is contained in a compartment 18 of the magazine 14, the pulse motor 26 then continues to be rotated to feed the magazine 14 until the succeeding element 20 has been detected. When the trailing end of the magazine 14 is detected by the phototransistor 37 in cooperation with the light emission diode 34, rotation of the pulse motor 26 is stopped.

Numeral 39 denotes another or second pulse motor having a rotatable shaft 40 on which a gear 41 is fixedly mounted. The gear 41 is adapted to mesh with rack teeth 43 formed in a slide bar 42 which has a lift plate 44 mounted on the top thereof. When the pulse motor 39 is rotated in a predetermined direction, the slide bar 42 is moved upwardly, as a result of which the lift plate 44 is inserted into the aperture 16 formed in the bottom of the magazine 14 thereby to lift up a single element 20 to allow it to be extracted or removed from the magazine 14.

A disc 45 is fixedly mounted on the rotatable shaft 40 of the pulse motor 39 and has a notch 46 formed in the peripheral edge thereof. A pair of light emission diodes 47 and 48 are disposed in opposition to associated phototransistors 49 and 50 with the notched disc 45 disposed therebetween. These phototransistors 49 and 50 cooperate with the light emission diodes 47 and 48 to detect whether the slide bar 42 has been displaced for a predetermined distance.

In FIG. 6, numeral 51 denotes generally a heating and measuring unit, the structure of which will be described below by referring to FIGS. 6, 7 and 8.

Figure 7:
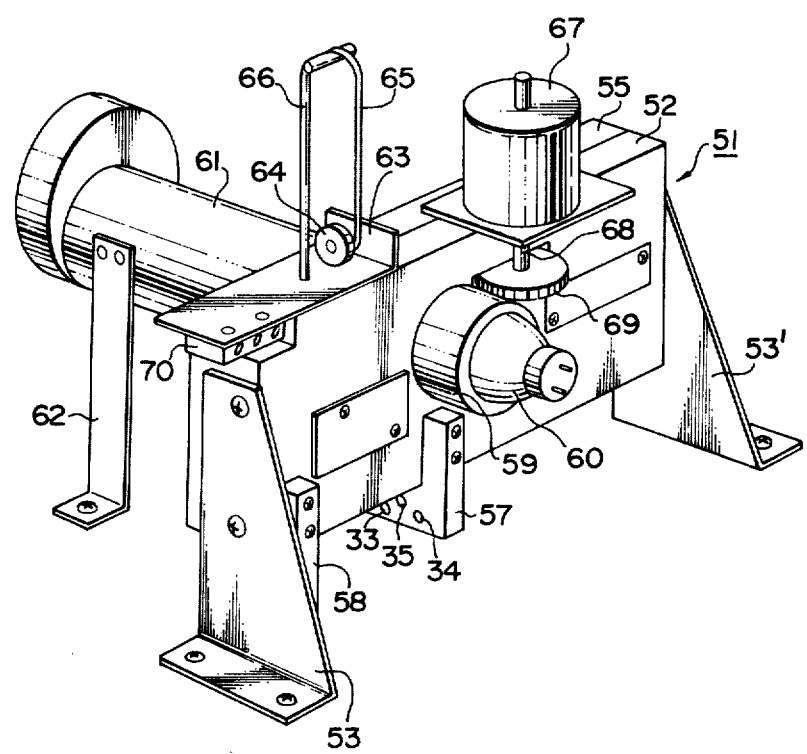
FIG. 7 is a perspective view showing the heating measuring portion of the thermo-luminescence dosimeter shown in FIG. 6.

Referring to FIG. 7, numeral 52 denotes a box-like main housing which is supported by a pair of brackets 53 and 53' and has guide rods 54, 54' (refer to FIG. 6) anchored thereto. A plate-like auxiliary housing 55 is stacked or superposed onto the main housing 52 under the guidance by the guide rods 54 and 54' and fixedly secured to the main housing 52 by means of screws 56 and 56' (refer to FIG. 6). Mounted on the main housing 52 are supports 57 and 58 of which the supporting member 57 supports the light emission diodes 33, 34 and 35, while the supporting member 58 supports the phototransistors 36, 37 and 38. The magazine 14 is adapted to be moved between the supporting members 57 and 58. A light collecting tube 59 is secured to the main housing 52 and has a heating lamp 60 mounted thereon. A photoelectric multiplier tube 61 is disposed at the auxiliary housing 55 by means of a supporting bracket 62. A plate 63 is fixedly mounted on the housings 52 and 55 and serves for rotatably supporting a roller 64 around which a spiral spring 65 is wound. A gripping rod 66 is mounted on the main housing 52 slidably through a bearing 71 (refer to FIG. 8) and has a top end to which one end of the coil spring 65 is secured, whereby the rod 66 is resiliently urged downwardly. Numeral 67 denotes a pulse motor secured to the main housing 52 and has a rotatable shaft 68 on which a gear 69 is fixedly mounted. The pulse motor 67 constitutes a drive source for extracting the card 9 from the case main body 1 of the element 20 for transportation of the card 9. Numeral 70 denotes a micro-switch which is turned off when the auxiliary housing 55 is removed from the main housing 52, thereby to interrupt a high voltage power supply to the photoelectric multiplier tube 61. Thus, the micro-switch 70 serves to protect the photoelectric multiplier tube from any possible damages due to impingement of external light rays of high intensity upon removal of the auxiliary housing 55.

Next, the internal structure of the heating and measuring unit 51 will be described by referring to FIG. 8.

In this figure, numeral 72 denotes a longitudinal groove formed in a side wall of the main housing at which the auxiliary housing 55 is mounted. A release plate 73 is fixedly disposed at the upper side of the longitudinal groove 72 and has an integral projection 74 adapted to be inserted into the notch 5 formed in the case body 1 of the element 20 described hereinbefore. A lamp array 75 is provided in the bottom wall of the longitudinal groove 72.

Numeral 76 denotes a transversal groove which is formed in the main housing 52 and adapted to receive slidably a card driving plate 77. Formed integrally with the card driving plate 77 at one end thereof is a latch projection 78 which is adpated to engage with the recess 13 formed in the card 9 (refer to FIG. 2). A filter 79 made of a carbon film or the like is mounted on the card driving plate 77 to check the power of the heating lamp 60. Further, a calibrating light source 80 made of a luiminous paint or the like is mounted on the card driving plate 77 for adjusting the sensitivity of the photoelectric multiplier tube 61 and an associated measuring circuit (not shown).

Referring to FIG. 18 which shows a sectional view of the card driving plate 77, numeral 120 denotes an opening having an offset portion in which a container 121 containing a luminous paint or like light emission material 122 is snugly and fixedly received and is covered by a glass plate 123 to constitute the light source 80 for calibration. When the surface of the glass plate 123 is contaminated, it is difficult to effect calibration with the desired accuracy. However, in the case of the illustrated embodiment, the glass plate 123 can be exposed for easy cleaning by removing the auxiliary housing 55 from the main housing 52.

Referring back to FIG. 8, numerals 81, 82, 83, 84 and 85 denote small apertures formed in the card driving plate 77. A roller 87 bearing against the card driving plate 77 is mounted by means of a fixture 86.

A member 88 having small apertures 89, 90, 91 and 92 formed therein and provided with phototransistors is mounted on the bottom wall of the transversal groove 76.

In the following, the operations for extracting the element 20 from the magazine 14 and feeding to the heating and measuring unit or station will be briefly described by referring to FIG. 8.

As the slide bar 42 is moved upwardly, the lift plate 44 mounted at the top of the bar 42 is inserted into the aperture 16 formed in the bottom of the magazine 14 thereby to lift upwardly the element 20 contained within the magazine. In the course of this operation, the gripping rod 66 urged downwardly by the coil spring 65 will bear against the top side of the element 20 to hold the latter in a sandwiched manner in cooperation with the lift plate 44. The element is then moved into the longitudinal groove 72 of the main housing 52 in the gripped state. When the element 20 is further moved upwardly, the element 20 will bear against the upper edge of the longitudinal groove 72, whereupon information is read out from the data read-out field 7 of the element 20. At this position, the projection 74 engages in the notch 5 provided in the element 20, while the latch 12 formed in the card 9 of the element 20 is disengaged from the notch 5. At the same time, the latch projection 78 of the card driving plate 77 is brought into engagement with the recess 13 formed in the card 9. Subsequently, the card driving plate 77 is moved to extract the card 9 and insert it in the transversal groove 76, thereby placing the thermo-luminescence materials 11 sequentially on an optical axis L to effect the measurements. After the measurements have been completed, the card 9 is stored in the main encasing body 1 of the element 20 which is then moved downwardly to be accommodated within the magazine 14.

Now, various portions shown in FIG. 8 will be described in detail by referring to FIGS. 9 to 13.

Figure 8:
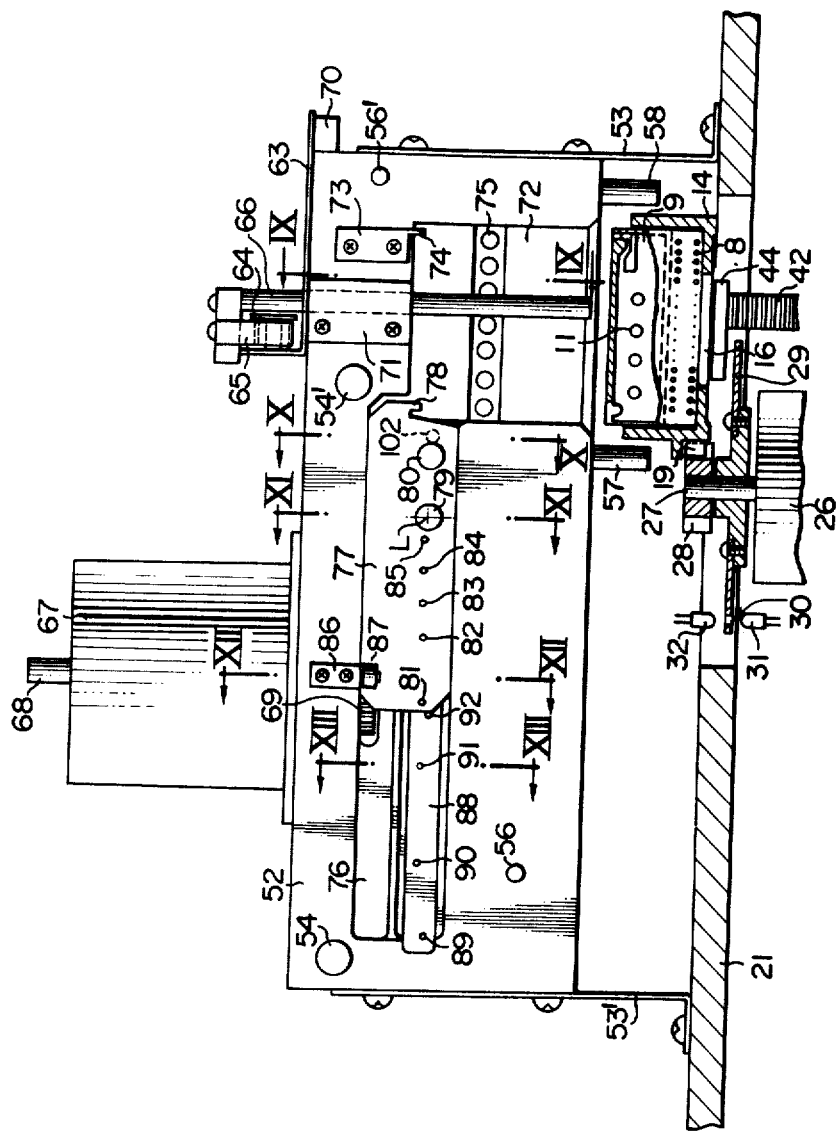
FIG. 8 is a sectional view showing the main portion of the thermo-luminescence dosimeter shown in FIG. 6.
Figure 9:
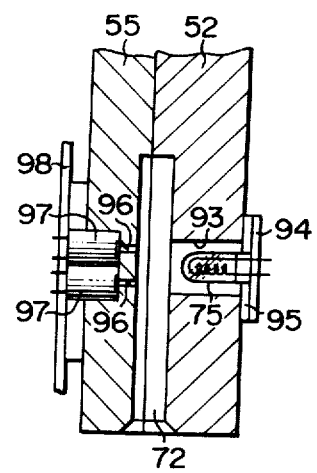
FIG. 9 is a sectional view taken along the line IX—IX in FIG. 8.

Referring to FIG. 9 which is a sectional view taken along the line IX—IX in FIG. 8, numeral 93 denotes holes formed in the main housing 52 and each adapted to receive the lamp 75 described hereinbefore. The lamp 75 is mounted on a printed-circuit board 94 together with a reflecting plate 95. Numeral 96 denotes a small hole formed in the auxiliary housing 55. Behind the hole 96, there is disposed a light sensor 97 in alignment with the lamp 75. The light sensor 97 is mounted on a printed-circuit board 98. The data read-out portion 7 of the element 20 is interposed between the lamps 75 and the light sensors 97 to derive various information by detecting through the light sensors 97 whether light from the lamps 75 impinges onto the associated sensor 97 through the holes 8 formed in the data read-out portion of the element 20.

Figure 10:
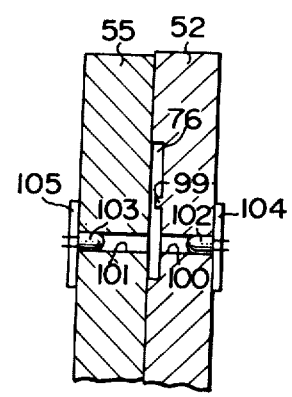
FIG. 10 is a sectional view taken along the line X—X in FIG. 8.

Referring to FIG. 10 which shows a cross section taken along the line X—X in FIG. 8, the transversal groove 76 of the main housing 52 is formed with a rib 99 which defines therebelow the path along which the card 9 is transported. Holes 100 and 101 formed in the main housing 52 and the auxiliary housing 55 receive a light emission diode 102 and a phototransistor 103, respectively. Numerals 104 and 105 denote printed-circuit boards for mounting thereon the light emission diode 102 and the phototransistor 103, respectively, which cooperate with each other to detect possible injuries as well as presence and absence of the thermo-luminescence material 11 carried by the card 9.

Figure 11:
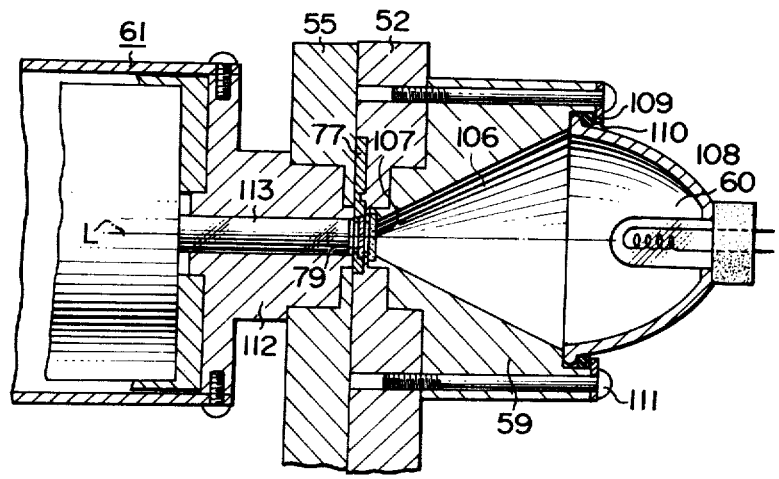
FIG. 11 is a sectional view taken along the line XI—XI in FIG. 8.

Referring to FIG. 11 which shows a sectional view taken along the line XI—XI in FIG. 8, 59 denotes a light collecting tube in which a conical through-hole 106 is formed. An infrared transmissive filter 107 is mounted at a tapered open end of the conical through-hole 106. In opposition to the through-hole 106, there is disposed a heating lamp 60 together with a reflecting mirror 108 at the other flared open end and held stationarily by means of an annular plate 110 through an interposed O-ring 109. The annular plate 110 is fixedly secured to the main housing 52 by means of set screws 111. A seat member 112 is mounted in a socket formed in the auxiliary housing 55 and has a center hole fitted with an optical glass conductor 113. The photoelectric multiplier tube 61 is secured to the seat member 112 by means of screws. As will be seen from FIG. 11, the filter 79 mounted on the card driving plate 77 as described hereinbefore is positioned between the infrared transmissive filter 107 and the optical glass conductor 113. Thus, when the thermo-luminescence material 11 carried by the card 9 is fed to the position between the infrared transmissive filter 107 and the optical glass fiber or conductor 113, the thermo-luminescence material 11 is heated through irradiation by the heating lamp 60 to emit thermo-luminescence which is then applied to the photoelectric multiplier tube 61 through the optical glass fiber conductor 113 to be converted into a corresponding electric current.

Figure 12:
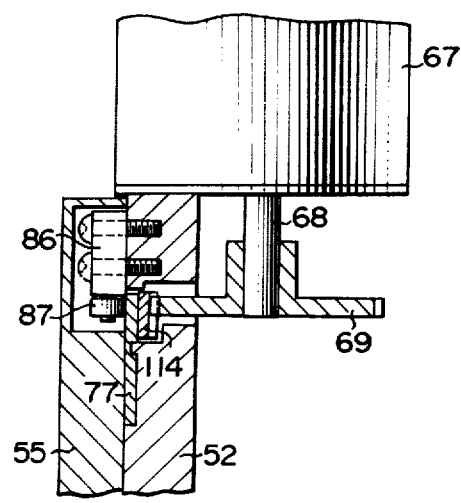
FIG. 12 is a sectional view taken along the line XII—XII in FIG. 8.

Referring to FIG. 12 which is a sectional view taken along the line XII—XII in FIG. 8, numeral 114 denotes a rack provided at the card driving plate 77 and adapted to mesh with the gear 69 described hereinbefore, whereby the card driving plate 77 is slidably moved through rotation of the pulse motor 67.

Figure 13:
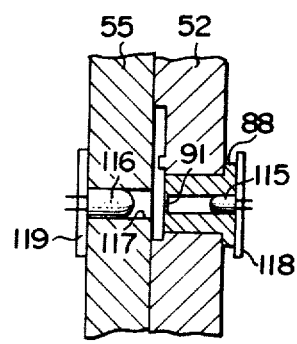
FIG. 13 is a sectional view taken along the line XIII—XIII in FIG. 8.

Referring to FIG. 13 which shows a sectional view taken along the line XIII—XIII in FIG. 8, a phototransistor 115 is disposed in a member 88 which in turn is mounted on the main housing 52. Numeral 116 denotes a light emission diode disposed within a hole 117 formed in the auxiliary housing 55, numeral 118 denotes a circuit-printed board for mounting the phototransistor, and 119 designates a circuit-printed board for mounting the light emission diode 116. The light emission diode 116 and the phototransistor 115 cooperate to detect whether the card driving plate 77 is stopped at a predetermined position.

Now, description will be made on the operation of the radiation dosimeter of the structure described above.

In FIGS. 6 and 8, the dosimeter apparatus is shown in the state in which the magazine 14 is inserted from the exterior. Upon insertion of the magazine 14, the rack 19 thereof is brought into meshing engagement with the gear 28, while the light rays from the light emission diode 33 is shielded by the magazine 14, whereby the insertion of the magazine 14 is detected through the phototransistor 36.

When a start switch (not shown) is closed in this state, the pulse motor 39 is rotated by a predetermined number of pulses to move the slide bar 42 upwardly, as the result of which the element 20 within the magazine 14 is also lifted upwardly and introduced into the longitudinal groove 72 provided in the main housing 52. The element 20 is then fed to the upper limit of the groove 72 (FIG. 14).

In the meanwhile, the disc 45 is rotated to a position at which the notch 46 thereof is located between the light emission diode 48 and the phototransistor 50. Thus, the detection is made to ascertain that the element 20 has been lifted to the normal position.

Figure 14:
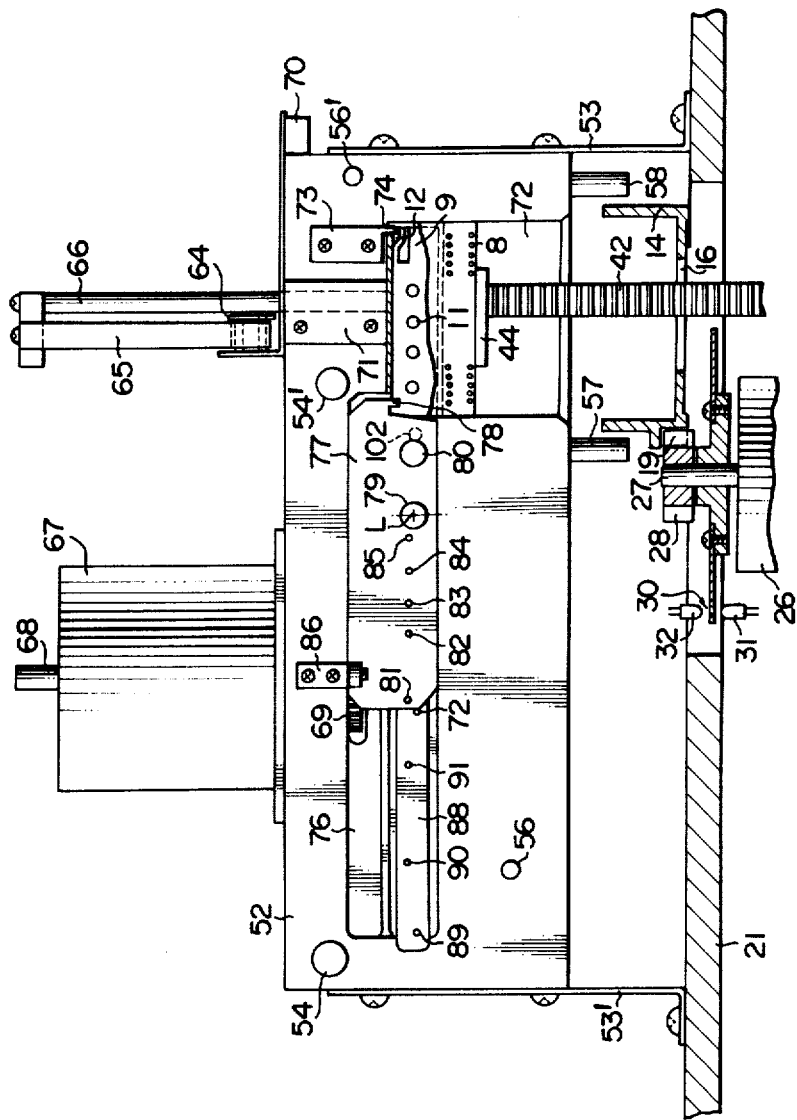
FIG. 14 is a view similar to FIG. 8 and shows the main portion of the thermo-luminescence dosimeter in the state for transporting the dosimeter elements.

As will be seen from FIG. 14, when the element 20 has attained the upper limit of the longitudinal groove 72, the projection 74 is inserted into the notch 5 of the element 20, while the latch 12 of the card 9 is simultaneously disengaged from the notch 5. Additionally, the latch projection 78 of the card driving plate 77 will engage in the recess 13 formed in the card 9.

When the element 20 has been fed to the position shown in FIG. 14, the lamp 75 shown in FIG. 9 is lit, whereby data or information in the data read-out portion 7 of the element is read out through the light sensor 97.

Subsequently, the hearing lamp 60 shown in FIG. 11 is energized to heat the filter 79. The infrared rays thus produced by the heated filter 79 impinge on the photoelectric multiplier tube 61. In this manner, it can be checked to determine whether the heating by the lamp 60 can be normally effected.

Figure 15:
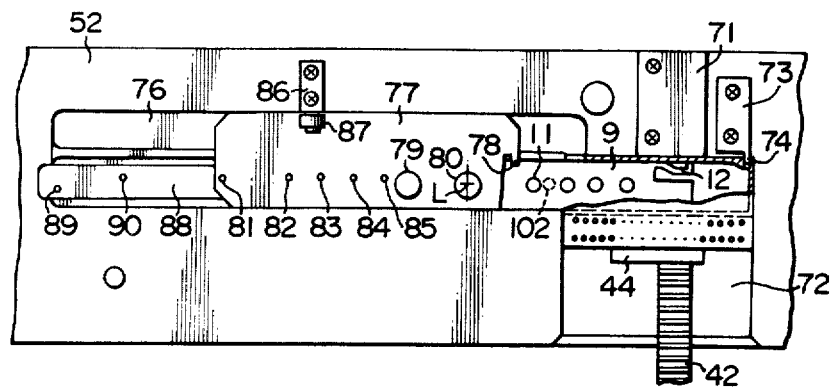
FIGS. 15 and 16 are sectional views showing the main portion of the thermo-luminescence dosimeter in the state for transporting a card.

On the other hand, the pulse motor 67 shown in FIG. 12 is rotated for an angular distance corresponding to the commanded number of pulses, thereby moving the card driving plate to extract the card 9 from the case main body 1 and introduce the extracted card 9 into the transversal groove 76. Thus, the card driving plate 77 is fed to a position at which the calibrating light source 80 mounted on the driving plate 77 is positioned on the optical axis L for the heating measurement (FIG. 15). In this state, the small hole 81 formed in the card driving plate 77 will coincide with the small hole 91, whereby detection is made as to the correct positioning of the card driving plate 77 through the light emission diode 116 and the phototransistor 115 shown in FIG. 13. During the transportation of the card 9 to the position shown in FIG. 15, the leftmost one of the thermo-luminescence materials 11 provided at the plural places on the card 9 will pass between the light emission diode 102 and the phototransistor 103. Thus, a check is made as to the presence or absence of the leftmost thermo-luminescence material 11 as well as possible injuries or damages thereof.

When the light source 80 for calibration has attained the heating and measuring position on the optical axis L, as is shown in FIG. 15, the quantity of light emitted from the calibrating light source 80 is measured by the photoelectric multiplier tube 61. Thus, the sensitivity of the photoelectric multiplier tube 61 can be determined.

Figure 16:
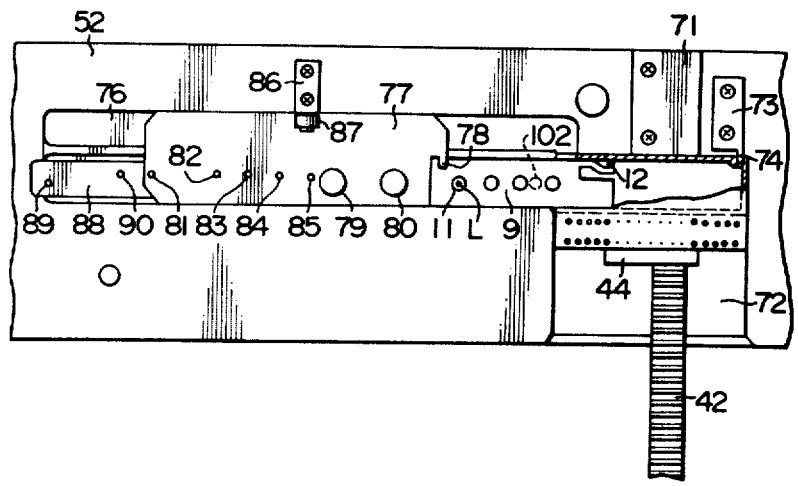

When the pulse motor 67 is rotated in correspondence to the commanded number of pulses, the card driving plate 77 together with the card 9 are further displaced to a position at which the leftmost thermo-luminescence material 11 on the card 9 is positioned on the optical path L for the heating and measurement, as is shown in FIG. 16. Then, the small bore 82 formed in the card driving plate 77 will coincide with the small hole 91, whereby a check is made to whether the card driving plate 77 has been correctly transported. During the transportation of the card driving plate to the position shown in FIG. 16, the presence or absence as well as possible damages or injuries of the second and the third thermo-luminescence materials 11 as counted from the leftmost one are examined through the operation of the light emission diode 102 and the phototransistor 103 shown in FIG. 10.

In the state shown in FIG. 16, the heating lamp 60 is energized to heat the leftmost thermo-luminescence material 11 on the card 9. The material 11 then produces thermo-luminescence which is applied to the photoelectric multiplier tube 61 thorugh the optical glass fiber conductor 113 to be converted into an electric current which is then integrated. The integrated current value as detected provides a measure for the exposed radiation dose to be determined.

After the measurement for the leftmost thermo-luminescence material on the card 9 has been carried out in the manner described above, the card driving plate 77 is further moved to a position at which the second thermo-luminescence material as counted from the leftmost one is positioned on the optical axis L and undergoes the measurement of exposed radiation dose in a similar manner. In this state, it is verified whether the card driving plate 77 has been normally displaced through the coincidence of the small hole 83 of the card driving plate 77 with the small hole 91. Further, during the transportation of the card driving plate 77, the presence or absence as well as possible injuries of the second thermo-luminescence material 11 can be determined.

In the similar manner, a third and the fourth thermo-luminescence materials 11 are sequentially measured.

When the measurements for the four thermo-luminescence materials 11 on the card 9 have been completed, the pulse motor 67 is rotated in the reverse direction in correspondence with the commanded number of pulses, whereby the card driving plate 77 together with the card 9 are restored to the position shown in FIG. 14 thereby to encase the card 9 within the case main body 1. At this time, the small hole 92 is freed of the shielding function by the card driving plate 77, whereby verification is made that the card driving plate 77 has been restored to the normal position. Further, in the course of the card 9 being fed along the longitudinal groove by the card driving plate 77, the presence or absence as well as possible injuries of the thermo-luminescence materials 11 is checked through cooperation of the light emitting diode 102 and the phototransistor 103.

Subsequently, the pulse motor 39 shown in FIG. 6 is rotated in accordance with the commanded number of pulses, therby to move the slide bar 42 and hence the element 20 downwardly to the position shown in FIG. 8 to encase the element 20 within the magazine. During this operation phase, the disc 45 mounted on the rotatable shaft 40 of the pulse motor 39 is rotated to the position at which the notch 46 formed in the disc 45 lies on the optical path extending from the light emission diode 47 to the phototransistor 49, whereby the restoration of the slide bar to the normal starting position can be detected.

Next, the pulse motor 26 is rotated in accordance with the commanded number of pulses thereby to advance the magazine 14 by one pitch. At that time, one of the holes 30 formed in the disc 29 mounted on the rotatable shaft 27 of the pulse motor 26 is positioned on the optical path extending between the light emission diode 31 and the phototransistor 32, to verify that the magazine 14 has been advanced properly by one pitch.

Subsequently, second, third, ..., n-th elements 20 are successively measured in a similar manner. Upon completing measurement of the last element 20, the trailing end of the magazine 14 leaves the optical path interconnecting the light emitting diode 34 and the phototransistor 37, whereby an indication is given that the magazine 14 has been fed to the terminal position. Then, the pulse motor 26 is rotated in the reverse direction to drive the magazine until the magazine 14 has been moved outside the optical path between the light emission diode 33 and the phototransistor 36, i.e. until the rack 19 of the magazine has been released from engagement with the gear 28. This magazine is extracted outwardly. The dosimeter apparatus is now in the state ready for carrying out the measurement for other elements in a similar manner to that described above.

FIG. 17 illustrates the distances among the filter 79, the calibrating light source 80, the light emission diode 102 and thermo-luminescence materials 11 carried by the card 9 encased within the element 20 on the assumption that the card driving plate 77 and the element 20 have been located at the respective positions shown in FIG. 14. In that state, the filter 79 is positioned on the optical axis or path L extending between the heating system and the photoelectric multiplier tube. The distance between the filter 79 and the light emitting diode 102 is given by $P(2+0.5)$ and the more general expression P(n+0.5) where n=0, 1, 2, 3, .... Further, if the distance between the filter 79 and the calibrating light source 80 is represented by a with the distance between the light emission diode 102 and the leftmost thermo-luminescence material 11 represented by b, then the equation $a=b+p$. $(0+0.5)$ will apply. The general expression is $a=b+p$ $(n+0.5)$ where n=0, 1, 2, 3 ....

So far as the above relationships are satisfied, the light emission diode 102 can be positioned between the thermo-luminescence materials 11, when the calibrating light source 80 or thermo-luminescence material 11 is positioned on the optical axis L as the card driving plate 77 is intermittently moved, whereby the presence or absence as well as possible injuries or damages of the thermo-luminescence material 11 that is, the condition of material 11, can be detected by the optical detecting system composed of the light emission diode 102 and the phototransistor 103 during the intermittent operation of the card driving plate 77.

In the case of the hitherto known thermo-luminescence type dosimeter apparatus of this kind, detection for the presence or absence as well as possible damages of the thermo-luminescence materials 11 is carried out separately and independently from the transportation or feeding of the card. In contrast, the apparatus according to the invention is capable of performing the above detections successively for the thermo-luminescence materials during the feeding of the card.

In the thermo-luminescence dosimeter element of the kind described above, there is a tendency that a film is provided in each of the holes 10 of the card 9 and the thermo-luminescence material 11 is dispersed thinly and fixedly on the film in an attempt at reducing the heating and measuring time duration.

However, such a thin structure is likely to be subjected to damages or injuries due to external mechanical force or burning under heating. When the thermo-luminescence material is fed to the heating and measuring station in the injured or burnt state, light rays from the heating lamp 60 will pass through the hole 10 of the card 9 straightforwardly to impinge onto the photoelectric multiplier 61, thereby to eventually degrade the sensitivity thereof. Thus, the detection of the presence or absence as well as possible injuries of the thermo-luminescence material is highly desirable.

FIG. 19 shows a pulse motor 39 according to another embodiment of the invention. In the case of the illustrated embodiment, a fixture 124 is secured to the rotatable shaft 40 of the pulse motor 39, while the gear 41 is rotatably supported on the shaft 40. A spring 125 having one end secured to the metal fixture 124 is connected to the rotatably supported gear 41 at the other end.

In the structure in which the gear 41 is connected to the shaft 40 through the spring 125 as described above, any dimensional or positional errors between the pulse motor 39 and the upper end of the longitudinal groove 72 of the main housing 52 can be compensated by the spring 125 by rotating the pulse motor 39 to some excessive degree, whereby need for an accurate positional adjustment of the pulse motor 39 relative to the main housing 52 can be eliminated with dimensional non-uniformity of the elements 20 being also compensated.

FIG. 20 shows the heating and measuring unit according to another embodiment of the invention. In this case, the main housing 52 and the auxiliary housing 55 are connected to each other at the ends thereof by means of hinges 126. Numeral 127 denotes a positioning pin provided at the main housing 52. When the auxiliary housing 55 is rotated to be superposed onto the main housing 52, the positioning pin 127 will be inserted into a hole 128 formed in the auxiliary housing 55 to position the latter properly.

With the structure of the thermo-luminescence type radiation dosimeter apparatus according to the invention, the following advantages can be attained 1. A number of elements can be sequentially measured in an automated manner.

2. Because the thermo-luminescence material is heated by infrared rays, the time duration required for the heating is remarkably short as compared with the heat by hot air, whereby the whole measuring time can be significantly reduced.

3. Due to such structure that the thermo-luminescence material is usually encased within the case main body and the card carrying the thermo-luminescence material is automatically extracted from the case and fed to the measuring station, the thermo-luminescence material is protected from ambient illumination, whereby a measurement of high accuracy can be obtained.

4. Because the thermo-luminescence material is not touched by an operator's hands, there will arise no possibility that dust and fat would be deposited on the thermo-luminescence material. Thus, no degradation in the accuracy of measurement will occur due to false signals which are ascribable to the deposition of dust and fat during the heating and measuring process.

5. By virtue of a construction such that the element is first fed into the longitudinal groove and then the card is extracted from the element to be fed into the transversal groove formed in the housing and that the transporting or feeding mechanisms for the element and the card can be provided independently from each other, the dosimeter apparatus can be implemented in a simple structure of small size.

6. Because the card is automatically disengaged from the case main body at the terminal end of the longitudinal hole formed in the housing, there is no need for providing an unlocking mechanism utilizing a solenoid or the like.

We claim:

1. An automatic thermo-luminescence dosimeter comprising:

at least one thermo-luminescence dosimeter element including a card carrying a thermo-luminescence material, said card being contained within an encasing member;

a magazine adapted to accommodate therein a plurality of said thermo-luminescence dosimeter elements;

means for transporting said magazine to a predetermined position;

dosimeter element feeding means for extracting one of said thermoluminescence dosimeter elements from said magazine and feeding said element into a longitudinal groove formed in a housing;

releasing means for releasing engagement between the card and encasing member of said one dosimeter element;

card feeding means for taking the card from the encasing member of said one dosimeter element and feeding said card into a transversal groove formed in said housing;

heating means for heating said thermo-luminescence material carried by the card fed to said transversal groove by irradiating said material with infrared rays; and photoelectric converter means for converting the thermo-luminescence emitted by said thermo-luminescence material into an electric signal, said card feeding means returning said card to said encasing member and said dosimetric element feeding means returning said encasing member and card to said magazine after measurement of said thermo-luminescence element by said photoelectric converter.

2. A thermo-luminescence dosimeter according to claim 1, wherein said magazine transporting means comprises a rack formed in said magazine, a pulse motor, a gear provided at said pulse motor and adapted to mesh with said rack, and rotation detecting means for allowing said pulse motor to be rotated by a predetermined angle, whereby said magazine is transported at a predetermined pitch.

3. A thermo-luminescence dosimeter according to claim 2, wherein said rotation detecting means includes a disc having a predetermined number of holes formed therein and mounted on a rotatable shaft of said pulse motor, and a light emission diode and a phototransistor disposed in opposition to each other with said disc being interposed therebetween.

4. A thermo-luminescence dosimeter according to claim 1, wherein said dosimeter element feeding means comprises a pulse motor, a gear mounted on a rotatable shaft of said pulse motor, and a slide bar provided with a rack adapted to mesh with said gear.

5. A thermo-luminescence dosimeter according to claim 4, wherein said gear is rotatably mounted on said rotatable shaft of said pulse motor and is coupled to said shaft through a spring.

6. A thermo-luminescence dosimeter according to claim 1, wherein said card feeding means is composed of a card driving plate supported slidably within said transversal groove, a pulse motor fixedly mounted on said housing, a gear secured to a rotating shaft of said pulse motor, and a rack provided at said card driving plate and adapted to mesh with said gear.

7. A thermo-luminescence dosimeter according to claim 1, wherein said housing is composed of a main housing provided with said longitudinal groove and said transversal groove and an auxiliary housing of a sheet-like configuration superposed onto said main housing.

8. A thermo-luminescence dosimeter according to claim 7, wherein said heating means for heating said thermo-luminescence material is secured to said main housing, and said photoelectric converter means for converting thermo-luminescence emitted from said thermo-luminescence material into an electric current is secured to said auxiliary housing.

9. A thermo-luminescence dosimeter according to claim 6, wherein said card driving plate is provided with a projection adapted to engage with a recess formed in said card, whereby said card is fed through said transversal groove with said recess being engaged by said projection of said card driving plate.

10. A thermo-luminescence dosimeter according to claim 6, which further includes first optical detecting means disposed across said card driving plate for detecting a predetermined position of said card driving plate by determining whether the optical axis of said first optical detecting means is interrupted by said card driving plate, and second optical detecting means for detecting a predetermined displacement of said card driving plate by determining whether the optical axis of said second optical detecting means extends through a bore formed in said card driving plate and a hole formed in said housing.

11. A thermo-luminescence dosimeter according to claim 6, wherein said card carries a plurality of thermo-luminescence materials disposed with a predetermined distance (p) between adjacent thermo-luminescence materials, said card driving plate has a filter and a calibrating light source disposed with a distance (a) therebetween, and said housing is provided with optical detecting means for detecting the condition of said thermo-luminescence material, the optical axis of said optical detecting means being positioned at a distance (b) from the thermo-luminescence material located at an end portion of said card, said distances being selected such that $a = b + p(n + 0.5)$ where $n = 0, 1, 2, \ldots$

* * * * *